United States Patent [19]

Fujimura

[11] Patent Number: 5,563,190
[45] Date of Patent: Oct. 8, 1996

[54] PHENOLIC RESIN MOLDING MATERIAL

[75] Inventor: Norihisa Fujimura, Fujieda, Japan

[73] Assignee: Sumitomo Bakelite Company Limited, Tokyo, Japan

[21] Appl. No.: 509,100

[22] Filed: Aug. 1, 1995

[30] Foreign Application Priority Data

Aug. 4, 1994 [JP] Japan ..................... 6-183386

[51] Int. Cl.$^6$ ..................................... C08K 5/20
[52] U.S. Cl. .................. 524/15; 524/47; 524/227; 524/230; 524/231; 524/307; 524/425; 524/448; 524/451; 524/494; 524/594; 524/275
[58] Field of Search ................... 524/15, 47, 425, 524/451, 494, 448, 227, 231, 230, 307, 594, 275

[56] References Cited

FOREIGN PATENT DOCUMENTS

| | | |
|---|---|---|
| 54-153858 | 12/1979 | Japan . |
| 2-232252 | 9/1990 | Japan . |
| 3-275576 | 12/1991 | Japan . |
| 6-192542 | 7/1994 | Japan . |

*Primary Examiner*—Veronica P. Hoke
*Attorney, Agent, or Firm*—Browdy and Neimark

[57] ABSTRACT

The present invention provides a phenolic resin molding material comprising:
 a phenolic resin composition comprising 100 parts by weight of a phenolic resin, 10–70 parts by weight of an organic filler and 10–70 parts by weight of an inorganic filler, and
 a releasant consisting of 0.2–4 parts by weight of an amide wax having a melting point of 130°–150° C. and 0.1–2 parts by weight of an ester wax and/or a partially saponified ester wax each having a melting point of 80°–105° C.

This phenolic resin molding material can provide a molded article which has good releasability and which shows excellent adherence to coating film formed thereon and excellent surface smoothness even after treatment at a high temperature and a high humidity.

8 Claims, No Drawings

PHENOLIC RESIN MOLDING MATERIAL

The present invention relates to a phenolic resin molding material capable of providing a molded article which has good adherence to coating film formed thereon and has excellent surface smoothness even after treatment at a high temperature and a high humidity.

Phenolic resin molding materials are in wide use in various molded articles such as heavy electric apparatuses, electrical parts, kitchen wares, lacquer Japan ware body, ash tray for automobile, and the like, owing to their excellent heat resistance, electrical insulation, etc. The molded articles are coated when they need to have decorativeness. In these molded articles or coated molded articles, there are problems. That is, in the coated molded articles, the coating film is peeled when they are used at normal temperature or at a high temperature and a high humidity; or in the molded articles, when they are coated after a long period of storage, cissing (runaway) occurs.

As a countermeasure for the above problems, the amount of a releasant used in a phenolic resin molding material has been reduced, or a releasant of high melting point (180°–220° C.) such as barium stearate, sodium stearate or the like has been used. However, in the molded article made from such a molding material, the adherence to coating film formed thereon is improved, but there still arises peeling of coating film formed thereon; moreover, releasability from the mold is inferior.

In recent years, the requirements for reliability of molded articles have become higher. That is, it is required that a molded article causes no peeling of coating film formed thereon even at a high temperature and high humidity and that the molded article maintains the initial smoothness and gloss of the coating film surface thereon even after a long period of use under such conditions. With molded articles made from the conventional molding materials, the above requirements (tightly adhered coating film and smooth surface) have not been satisfied.

The object of the present invention is to provide a phenolic resin molding material which is obtained by adding a particular releasant to a phenolic resin composition comprising a phenolic resin, an organic filler and an inorganic filler and which, even when used at a high temperature and a high humidity for a long period of time, causes no peeling of coating film formed thereon and maintains excellent smoothness and gloss of the coating film surface.

The present invention relates to a phenolic resin molding material comprising:

a phenolic resin composition comprising 100 parts by weight of a phenolic resin, 10–70 parts by weight of an organic filler and 10–70 parts by weight of an inorganic filler, and a releasant consisting of 0.2–4 parts by weight of an amide wax having a melting point of 130°–150° C. and 0.1–2 parts by weight of an ester wax and/or a partially saponified ester wax each having a melting point of 80°–105° C. Preferably, the organic filler has a particle size smaller than 150 mesh and is selected from the group consisting of thermosetting resin laminated board powder, plywood powder, coconut shell flour and rice hull flour.

The phenolic resin used in the present invention is generally a novolac type phenolic resin which preferably is a solid having a number-average molecular weight of 500–1,200. However, the phenolic resin is not restricted thereto and may be a resole type resin or a mixture of novolac type and resole type. The phenolic resin may be modified with xylene, an alkylphenol or the like.

The amide wax used as a releasant in the present invention is characterized by its melting point of 130°–150° C. The ester wax and/or the partially saponified ester wax also used as a releasant is characterized by the melting point of 80–105° C. In the present invention, the amide wax and the ester wax and/or the partially saponified ester wax must be used in combination. The preferable proportions are such that when the former is 1 part by weight the latter is 0.1–4 parts by weight.

The total amount used of the amide wax having a melting point of 130°–150° C. and the ester wax and/or the partially saponified ester wax each having a melting point of 80°–105° C. is 0.3–6 parts by weight per 100 parts by weight of the phenolic resin. The amounts used of the individual releasants are such that the amide wax is 0.2–4 parts by weight and the ester wax and/or the partially saponified ester wax is 0.1–2 parts by weight, both per 100 parts by weight of the phenolic resin. When the amounts of the individual releasants are less than the above, release of molded articles from a mold is poor; when the amounts are more than the above, the mold used is stained and the molded articles have poor appearance.

The amide wax having a melting point of 130°–150° C. includes a fatty acid amide ($RCONH_2$ wherein R is an alkyl group) and an N-substituted fatty acid amide (e.g., bisamide, $RCONHR'NHCOR$ wherein R and R' are each an alkyl group). Commercial products of the amide wax are, for example, Hoechst Wax C (a product of Hoechst Co.), etc.

The ester wax and the partially saponified ester wax each have a melting point of 80°–105° C. The ester wax is obtained by esterifying a fatty acid wax with a monohydric, dihydric or trihydric alcohol, and commercial products thereof are Hoechst Wax E, KPS, KSS, KSL and KP (these are products of Hoechst Co.), etc. The partially saponified ester wax is obtained by partially or wholly esterifying the above-mentioned alcohol with a fatty acid wax and then partially saponifying the resulting ester bond with an alkaline metallic compound, and commercial products thereof are Hoechst Wax O, OP and OM (these are products of Hoechst Co.), etc.

The organic filler used in the present invention preferably has a particle size smaller than 150 mesh and preferably is at least one member selected from the group consisting of a thermosetting resin laminated board powder, a plywood powder, a coconut shell flour and a rice hull flour. The organic filler is used in an amount of 10–70 parts by weight per 100 parts by weight of the phenolic resin. When the particle size of the organic filler is larger than 150 mesh, the resulting molded article tends to have a deteriorated surface smoothness when treated at a high temperature and a high humidity. The organic filler more preferably has a particle size of 200–450 mesh.

In the present invention, an inorganic filler is used, in addition to the organic filler, in an amount of 10–70 parts by weight per 100 parts by weight of the phenolic resin. The inorganic filler is not particularly restricted as to the kind, but is generally calcium carbonate, talc, clay, diatomaceous earth, a glass powder or a glass fiber.

The phenolic resin molding material according to the present invention can be made into a molded article by transfer molding, compression molding or injection molding. Of course, other molding methods can be used.

In ordinary phenolic resin molding materials, there are used a phenolic resin; a curing agent (hexamethylenetetramine); an organic filler such as wood flour, pulp powder or the like; an inorganic filler; and a releasant such as stearic acid, metal stearate, glycerine monostearate or the like. These releasants have poor compatibility with the phenolic resin and, by the action of the water present in the molded article obtained or of the water absorbed by the molded article, bleed onto the surface of the molded article from inside. This results in the molded article having poor adherence to coating film applied, and invites peeling of coating film formed or runaway of coating liquid ( runaway makes coating impossible).

The amide wax having a melting point of 130°–150° C. and the ester wax and/or the partially saponified ester wax each having a melting point of 80°–105° C., used in the present invention, all have high polarity and the polarity is similar to the polarity of the phenolic resin. Therefore, they have good compatibility With the phenolic resin. Hence, it is presumed that said releasants do not bleed onto the surface of the molded article obtained, even in the presence of the water possessed or absorbed by the molded article, to give a molded article having excellent adherence to coating film formed thereon.

The amide wax has a melting point of 130°–150° C. and the ester wax and/or the partially saponified ester wax each has a melting point of 80°–105° C. These melting points are lower than the mold temperature ordinarily used, i.e. 160°–180° C. Consequently, they are melted in the mold used, to provide excellent release of molded articles from the mold.

The organic filler used in the preferred embodiment of the present invention has a particle size smaller than 150 mesh, which is smaller than the particle size (80–120 mesh) of the wood flour or pulp powder used ordinarily. This enables high dispersion during blending of starting materials and high impregnation of the organic filler in the phenolic resin, to give a molded article having low hygroscopicity and, even after treatment at a high temperature and a high humidity, good surface smoothness.

In the preferred embodiment of the present invention, by using as a releasant a combination of an amide wax having a melting point of 130°–150° C. and an ester wax and/or a partially saponified ester wax each having a melting point of 80°–105° C. and as an organic filler at least one member selected from the group consisting of a thermosetting resin laminated board powder, a plywood powder, a coconut shell flour and a rice hull flour, all having a particle size smaller than 150 mesh, there can be obtained a phenolic resin molding material capable of providing a molded article which, even when treated at a high temperature and a high humidity for a long period of time, has good surface smoothness and excellent adherence to coating film formed thereon.

EXAMPLES 1–6 AND COMPARATIVE EXAMPLES 1–4

The starting components in the amounts shown in the upper column of Table 1 were heat-kneaded by use of a mixing roll and then ground to obtain individual molding materials. Each of the molding materials was molded into a test piece, which was tested for adherence to coating film (at normal state and after treatment of 240 hours at 50° C. and 95%, by crosscutting method), releasability, and surface smoothness of the molded article (at normal state and after treatment of 240 hours at 50° C. and 95%). The results are shown in the lower column of Table 1.

Test Methods

1. Adherence to Coating Film (Crosscutting Method)

A molded article (test piece) of 100 mm (diameter)×2 mm was obtained by transfer molding (175° C.×3 minutes) and then coated with a urethane coating. In the coating film of the coated molded article was formed, at an ordinary state and after treatment under high temperature and high humidity conditions (50° C./95%240 hours), 100 squares (1 mm×1 mm) by use of a cutter knife; thereon was adhered a cellophane tape; the tape was peeled at an angle of about 30°; and the number of said squares peeled was counted.

2. Surface Smoothness of Molded Article

The molded article obtained in the above 1 was measured for surface smoothness at ordinary state and after treatment under high temperature and high humidity conditions (50° C./95%/240 hours), by use of a surface roughness tester.

3. Releasability

A box type molded article (test piece) of 100 mm×60 mm×50 mm was produced by injection molding under the conditions of 175° C., 1,200 kg/cm$^2$ and 60 seconds. In this molding, the releasability of flash generated in air vent gap (0.05 mm) was rated.

⊙: Good release

Δ: Flash adhered to the mold in 20–30 shots.

x: Flash adhered to the mold in the first shot.

TABLE 1

| | | Examples | | | | | | Comparative Examples | | | |
|---|---|---|---|---|---|---|---|---|---|---|---|
| | | 1 | 2 | 3 | 4 | 5 | 6 | 1 | 2 | 3 | 4 |
| Starting Components wt. % | Novolac type phenolic resin (number-average molecular weight: 900) | 50 | 50 | 50 | 50 | 50 | 50 | 50 | 50 | 50 | 50 |
| | Hexamethylenetetramine | 8 | 8 | 8 | 8 | 8 | 8 | 8 | 8 | 8 | 8 |
| | Wood flour (particle size: 80–120 mesh) | 0 | 14 | 0 | 0 | 14 | 0 | 28 | 28 | 0 | 0 |
| | Phenolic resin laminated board powder (particle size: 200–400 mesh) | 28 | 14 | 14 | 28 | 14 | 14 | 0 | 0 | 0 | 0 |
| | Phenolic resin laminated board powder (particle size: 80–120 mesh) | 0 | 0 | 0 | 0 | 0 | 0 | 0 | 0 | 28 | 28 |
| | Plywood powder (particle size: 200–400 mesh) | 0 | 0 | 14 | 0 | 0 | 14 | 0 | 0 | 0 | 0 |
| | Calcium carbonate | 10 | 10 | 10 | 10 | 10 | 10 | 10 | 10 | 10 | 10 |
| | Amide wax of m.p. = 140° C. (*1) | 1 | 1 | 0.8 | 1 | 1 | 0.8 | 0 | 0 | 1 | 0 |
| | Ester wax of m.p. = 85° C. (*2) | 0 | 0 | 0 | 0.2 | 0.2 | 0.4 | 0 | 0 | 0 | 0 |

TABLE 1-continued

|  |  | Examples | | | | | | Comparative Examples | | | |
|---|---|---|---|---|---|---|---|---|---|---|---|
|  |  | 1 | 2 | 3 | 4 | 5 | 6 | 1 | 2 | 3 | 4 |
|  | Partially saponified ester wax of m.p. = 95° C. (*3) | 0.2 | 0.2 | 0.1 | 0 | 0 | 0 | 0 | 0 | 0 | 1.0 |
|  | Stearic acid | 0 | 0 | 0 | 0 | 0 | 0 | 1.2 | 0 | 0 | 0 |
|  | Calcium stearate | 0 | 0 | 0 | 0 | 0 | 0 | 0 | 1.2 | 0 | 0 |
|  | Coloring agent | 1.8 | 1.8 | 1.8 | 1.8 | 1.8 | 1.8 | 1.8 | 1.8 | 1.8 | 1.8 |
| Test Results | Adherence to coating film (at ordinary state) | 0 | 0 | 0 | 0 | 0 | 0 | 20 | 5 | 0 | 2 |
|  | Adherence to coating film (after treatment of 50° C./95%/240 hr) | 0 | 0 | 0 | 0 | 0 | 0 | 40 | 15 | 0 | 5 |
|  | Surface smoothness of molded article (at ordinary state), μm | 2 | 3 | 2 | 2 | 3 | 2 | 10 | 10 | 6 | 6 |
|  | Surface smoothness of molded article (after treatment of 50° C./95%/240 hr), μm | 3 | 6 | 3 | 3 | 6 | 3 | 20 | 20 | 13 | 13 |
|  | Releasability | ⊙ | ⊙ | ⊙ | ⊙ | ⊙ | ⊙ | ⊙ | x | Δ | ⊙ |

In Table 1, *1 is Hoechst Wax C (a product of Hoechst Co.); *2 is Hoechst Wax KPS (a product of the same company); and *3 is Hoechst Wax OP (a product of the same company).

As clear from Table 1, the phenolic resin molding material of the present invention can provide a molded article which has good releasability and which has excellent adherence to coating film formed thereon and excellent surface smoothness even after treatment at a high temperature and a high humidity. Therefore, the present invention is a useful industrial phenolic resin molding material.

What is claimed is:

1. A phenolic resin molding material comprising:

a phenolic resin composition comprising 100 parts by weight of a phenolic resin, 10–70 parts by weight of an organic filler and 10–70 parts by weight of an inorganic filler, and a releasant consisting of 0.2–4 parts by weight of an amide wax having a melting point of 130°–150° C. and 0.1–2 parts by weight of an ester wax and/or a partially saponified ester wax each having a melting point of 80°–105° C.

2. A phenolic resin molding material according to claim 1, wherein the organic filler has a particle size smaller than 150 mesh and is selected from the group consisting of a thermosetting resin laminated board powder, a plywood powder, a coconut shell flour and a rice hull flour.

3. A phenolic resin molding material according to claim 1, wherein the inorganic filler is selected from the group consisting of calcium carbonate, talc, clay, diatomaceous earth, a glass powder and a glass fiber.

4. A phenolic resin molding material according to claim 1, wherein the phenolic resin is a novolac type phenolic resin having a number-average molecular weight of 500–1,200.

5. A phenolic resin molding material according to claim 1, wherein the amide wax is a fatty acid amide, an N-substituted fatty acid amide or a mixture thereof.

6. A phenolic resin molding material according to claim 1, wherein the ester wax is obtained by esterifying a fatty acid wax with a monohydric, dihydric or trihydric alcohol.

7. A phenolic resin molding material according to claim 1, wherein the partially saponified ester wax is obtained by esterifying a fatty acid wax with a monohydric, dihydric or trihydric alcohol and then partially saponified the resulting ester bond with an alkaline metallic compound.

8. A phenolic resin molding material according to claim 1, wherein the ester wax and/or the partially saponified ester wax is used in an amount of 0.1–4 parts by weight per part by weight of the amide wax.

* * * * *